(12) United States Patent
Hsu

(10) Patent No.: US 10,372,170 B1
(45) Date of Patent: Aug. 6, 2019

(54) LINEAR SLIDING STRUCTURE OF LAPTOP KEYBOARD AND COVER CASE

(71) Applicant: Kunshan Lemtech Slide Technology Co., Ltd., Kunshan, Jiangsu (CN)

(72) Inventor: Chi Feng Hsu, New Taipei (TW)

(73) Assignee: Kunshan Lemtech Slide Technology Co., Ltd., Jiangsu (CN)

( * ) Notice: Subject to any disclaimer, the term of this patent is extended or adjusted under 35 U.S.C. 154(b) by 0 days.

(21) Appl. No.: 15/984,364

(22) Filed: May 20, 2018

(51) Int. Cl.
*A47B 88/57* (2017.01)
*G06F 1/16* (2006.01)

(52) U.S. Cl.
CPC ............ *G06F 1/1662* (2013.01); *A47B 88/57* (2017.01)

(58) Field of Classification Search
CPC .............................. A47B 88/487; A47B 88/57
USPC ........................................ 312/334.44, 334.46
See application file for complete search history.

(56) References Cited

U.S. PATENT DOCUMENTS

| | | | | |
|---|---|---|---|---|
| 3,650,578 A * | 3/1972 | Del Vecchio | ........ | A47B 88/493 312/334.46 |
| 3,658,394 A * | 4/1972 | Gutner | ................... | A47B 88/57 312/334.46 |
| 4,089,568 A * | 5/1978 | Fall | ....................... | A47B 88/487 384/18 |
| 5,147,138 A * | 9/1992 | Gutner | ................... | A47B 88/57 384/21 |
| 5,316,389 A * | 5/1994 | Hoffman | ............... | A47B 88/493 384/18 |
| 6,464,311 B2 * | 10/2002 | Liang | .................... | A47B 88/493 312/333 |
| 8,733,864 B2 * | 5/2014 | Chen | ..................... | A47B 88/493 312/333 |
| 2003/0021082 A1 * | 1/2003 | Lu | .......................... | G06F 1/1616 361/679.4 |
| 2008/0303399 A1 * | 12/2008 | Huang | ................... | A47B 88/49 312/334.46 |
| 2011/0081104 A1 * | 4/2011 | Chiang | ................ | A47B 88/487 384/19 |

* cited by examiner

*Primary Examiner* — Matthew W Ing

(57) ABSTRACT

A linear sliding structure of a laptop keyboard and cover case includes: a base member, a moving member, a sliding holder, a first resisting member, a second resisting member, and a ball. The ball is arranged in an accommodation portion of the sliding holder, such that two sides of the sliding holder where the ball is arranged come into contact with the base member and the moving member. The first resisting member and the second resisting member are respectively arranged at two ends of the base member to provide a resistance of an end position when the moving member undergoes a linear displacement. By way of the sliding holder where the ball is arranged, the linear displacement of the moving member extending toward one end is provided. A structure convenient for opening and closing is provided for the keyboard or the cover case.

3 Claims, 8 Drawing Sheets

US 10,372,170 B1

LINEAR SLIDING STRUCTURE OF LAPTOP KEYBOARD AND COVER CASE

BACKGROUND OF THE INVENTION

Field of the Invention

The present invention relates to a linear sliding structure of a laptop keyboard and cover case, and more particularly to a linear sliding structure which allows the cover case to open by sliding, by using a linear sliding guide.

Description of the Related Art

Computer equipment may bring many conveniences, and applications of the computer equipment to a variety of paperwork applications, graphics job applications, web applications, game applications, and applications of various needs can be quickly and accurately completed.

With the rapid development of the computer equipment and in coordination with the speed of the network, the game application is a great boon. In the borderless network linking, many changes are made in the development of e-sports games, and the game can be called up at any time through the Internet.

The applications of the computer equipment have different usage modes based on individual needs. However, users are distressed if computer equipment are used for a long time or a malfunction occurs. In this case, there is nothing to do but repair. The computers are classified into desktop computers and laptop computers. Particularly, the laptop computers are smaller in size and all the components are sophisticated, and thus more care and attention are required for maintenance. Furthermore, the maintenance procedures are relatively complicated, and the laptop computers need to be dismantled in sequence from their rear covers, which is relatively time-consuming, and there is also a relative risk of damage to the components in this process.

SUMMARY OF THE INVENTION

A linear sliding structure for a laptop cover case or keyboard is provided in view of the issues noted above. Due to the linear sliding structure, the cover case may be opened by pushing from the keyboard when a laptop computer is to be repaired, which may provide more convenient maintenance on the one hand since more sophisticated major components are arranged below the keyboard and provide more accurate detection and replacement on the other hand, minimizing the risk of damage, and providing more convenient and accurate and quick maintenance.

An aspect of the main objective of the present invention is to arrange a plurality of balls in a sliding holder, such that a moving member may undergo a linear displacement on a base member by way of the balls.

To achieve the above objective, the linear sliding structure of the present invention includes: a base member, a moving member, a sliding holder, a first resisting member, a second resisting member and a ball. The ball is arranged in an accommodation portion of the sliding holder, such that two sides of the sliding holder where the ball is arranged come into contact with the base member and the moving member. The first resisting member and the second resisting member are respectively arranged at two ends of the base member to provide a resistance of an end position when the moving member undergoes a linear displacement. By way of the sliding holder where the ball is arranged, the linear displacement of the moving member extending toward one end is provided. A structure convenient for opening and closing is provided for the keyboard or the cover case.

Further, a first rail portion and a stop portion are formed on the base member to allow the sliding holder to undergo a displacement and to resist.

Further, an accommodation portion, a first linking portion and a second linking portion are formed on the sliding holder. The accommodation portion provides an accommodation for the ball, the first linking portion correspondingly resists against the first resisting member, and the second linking portion correspondingly resists against the second resisting member.

A second rail portion, a first stop pin and a second stop pin are formed on the moving member. The second rail portion is corresponding to the ball in the sliding holder, the first stop pin is corresponding to the first resisting member, and the second stop pin is corresponding to the second resisting member.

The linear sliding structure may be implemented on the cover case of a laptop.

The linear sliding structure may be implemented on the keyboard of the laptop.

BRIEF DESCRIPTION OF THE DRAWINGS

FIG. 7-1 is a schematic diagram of the linear sliding structure of the laptop keyboard and cover case according to an embodiment of the present invention.

FIG. 7-2 is a schematic diagram of the linear sliding structure of the laptop keyboard and cover case according to the embodiment of the present invention.

DETAILED DESCRIPTION OF THE PREFERRED EMBODIMENT

Figure 1:
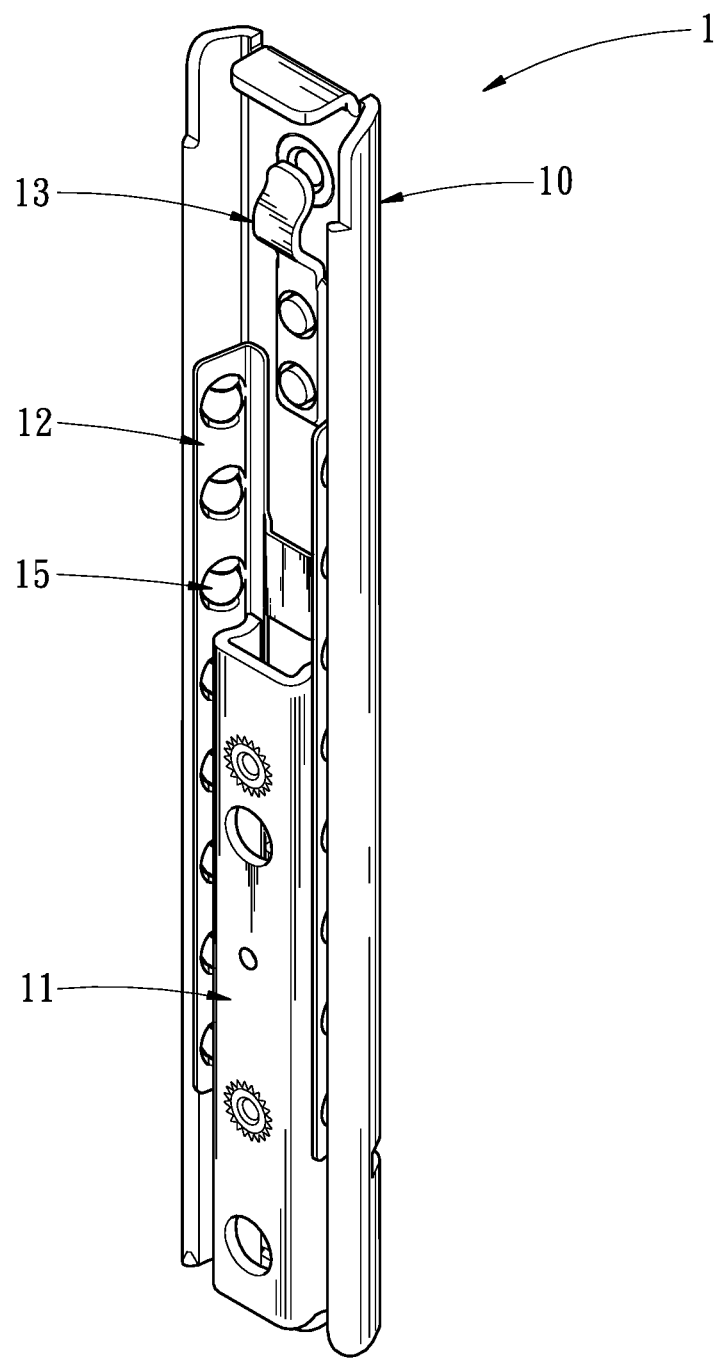
FIG. 1 is a three-dimensional schematic diagram of a linear sliding structure of a laptop keyboard and cover case according to the present invention.
Figure 2:
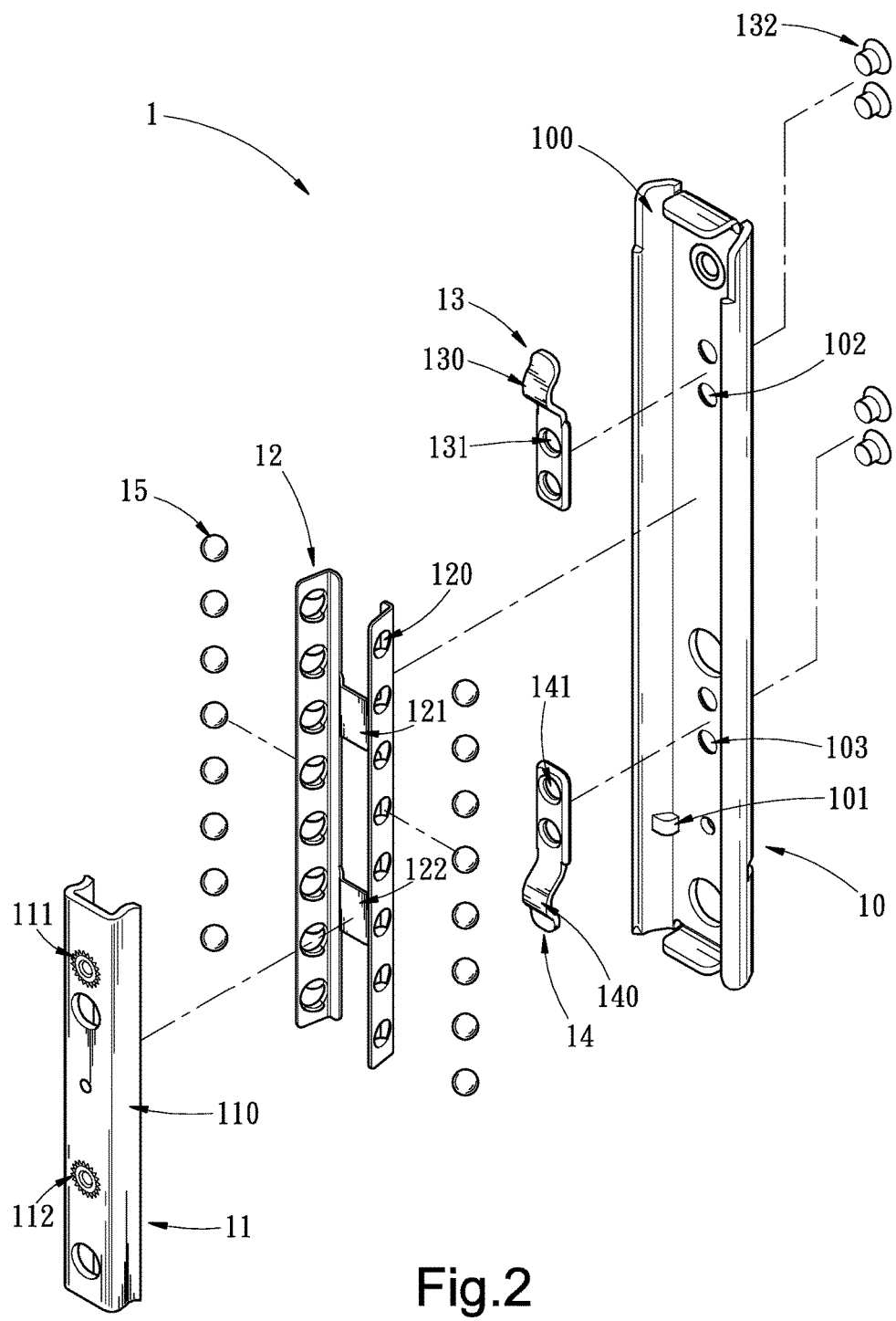
FIG. 2 is a schematic exploded pictorial drawing of the linear sliding structure of the laptop keyboard and cover case according to the present invention.

FIG. 1 and FIG. 2 show a linear sliding structure of the laptop keyboard and cover case according to the present invention. The linear sliding structure 1 includes: a base member 10, a moving member 11, a sliding holder 12, a first resisting member 13, a second resisting member 14 and a ball 15. By way of the linear sliding structure 1, the laptop keyboard or the cover case is allowed to perform a linear sliding movement.

Approximately shaped like an inverted U, the base member 10 has a first rail portion 100, a stopper 101, a first punch hole 102, and a second punch hole 103. The first rail portion 100 is formed at two sides of the base member 10 and forms an arc-shaped wall surface to correspond to the ball 15. The stopper 101 is formed at one end of the first rail portion 100 and corresponds to one end of the sliding holder 12. The first punch hole 102 is formed at one end of the base member 10 and corresponds to a first retaining hole 131 of the first resisting member 13, and then is retained by a bolt 132. The second punch hole 103 is formed at the other end of the base member 10 with respect to the first punch hole 102, and corresponds to a second retaining hole 141 of the second resisting member 14, and then is retained by the bolt 132.

Approximately shaped like an inverted U, the moving member 11 has a second rail portion 110, a first stop bolt 111, and a second stop bolt 112. The second rail portion 110 is formed at two sides of the moving member 11 and forms an arc-shaped wall surface to correspond to the ball 15. The first stop bolt 111 is arranged at one end of the moving member 11 and corresponds to a first resisting portion 130 of the first resisting member 13. The second stop bolt 112 is arranged at another end with respect to the first stop bolt 111 and corresponds to a second resisting portion 140 of the second resisting member 14.

Approximately shaped like an inverted U, the sliding holder 12 has an accommodation portion 120, a first linking portion 121, and a second linking portion 122. The accommodation portion 120 is formed between longitudinal wall surfaces at two sides of the sliding holder 12 and is arranged equidistantly to correspond to the ball 15. The first linking portion 121 is formed between longitudinal wall surfaces at two sides and forms into an arched shape. The second linking portion 122 is formed between longitudinal wall surfaces at two sides and forms into an arched shape, and is arranged at the other end with respect to the first linking portion 121.

Approximately shaped like a bent body, the first resisting member 13 has a first resisting portion 130 and a first retaining hole 131. Approximately shaped like an extending arc-shaped bent body, the first resisting portion 130 corresponds to the first stop pin 111 of the moving member 11. The first retaining hole 131 corresponds to the first punch hole 102 of the base member 10 and is retained by the bolt 132.

Approximately shaped like a bent body, the second resisting member 14 has a second resisting portion 140 and a second retaining hole 141. Approximately shaped like an extending arc-shaped bent body, the second resisting portion 140 corresponds to the second stop pin 112 of the moving member 11. The second retaining hole 141 corresponds to the second punch hole 103 of the base member 10 and is retained by the bolt 132.

The ball 15, made of a metal material, is arranged in the accommodation portion 120 of the sliding holder 12. By way of a plurality of balls 15 arranged in the sliding holder 12, a linear displacement extending toward one end is applied such that the moving member 11 may move back and forth on the base member 10.

Figure 3:
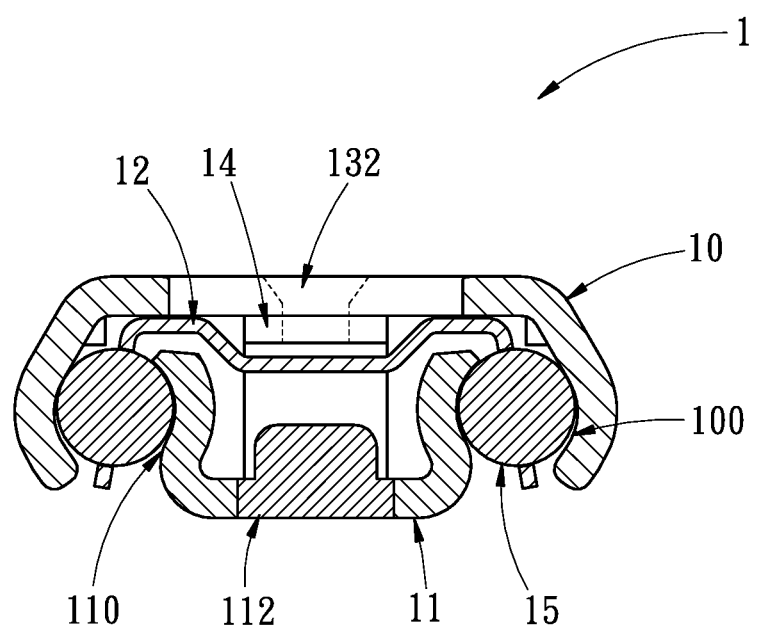
FIG. 3 is a schematic cross-sectional view of the linear sliding structure of the laptop keyboard and cover case according to the present invention.

Further, the linear sliding structure 1 as shown in FIG. 2 and FIG. 3 includes: a base member 10, a moving member 11, a sliding holder 12, a first resisting member 13, a second resisting member 14, and a ball 15. The ball 15 is arranged in the accommodation portion 120 between longitudinal wall surfaces at two sides of the sliding holder 12. An outer layer of the sliding holder 12 corresponds to the base member 10, and an inner layer of the sliding holder 12 corresponds to the moving member 11, such that the ball 15 in the accommodation portion 120 of the moving member 11 corresponds to the first rail portion 100 of the base member 10 and the second rail portion 110 of the moving member 11, and the moving member 11 may linearly slide by way of support of the sliding holder 12.

Figure 4:
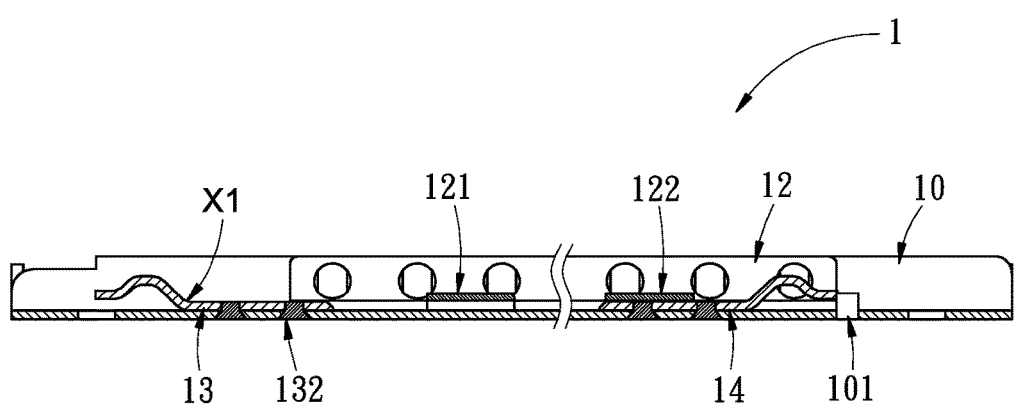
FIG. 4 is a schematic cross-sectional view of the linear sliding structure of the laptop keyboard and cover case according to the present invention.

As shown in FIG. 2, FIG. 3 and FIG. 4, the first resisting member 13 and the second resisting member 14 are arranged at two ends of the base member 10, the first resisting member 13 and the second resisting member 14 form into a rectangular shape one end of which is bent, where the first resisting portion 130 and the second resisting portion 140 are formed, and the moving member 11 is provided to correspond to the stop pin.

When the sliding holder 12 undergoes a linear movement on the base member 10, a stopping point at two ends thereof falls on a bending point of the first resisting member 13 and the second resisting member 14. The first linking portion 121 and the second linking portion 122 form into an arc-shaped bent body, such that the first linking portion 121 and the second linking portion 122 may pass through the first resisting member 13 and the second resisting member 14 and stop at the bending point. Further, a stopper 101 is formed at one end of the base member 10 where the second resisting member 14 is arranged. The stopper 101 also may serve as a final stopping point at one end, namely, the stopping point at one end when the sliding holder 12 undergoes a linear movement. However, with respect to the other end, the bending point X1 of the first resisting member 13 serves as the stopping point, such that the sliding holder 12 may have a fixed linear sliding movement range on the base member 10.

Further, as shown in FIG. 3, the sliding holder 12 and the moving member 11 are arranged on the base member 10. The moving member 11 may smoothly and linearly slide by way of friction between the ball 15 in the sliding holder 12 and the base member 10 and the moving member 11.

Figure 5:
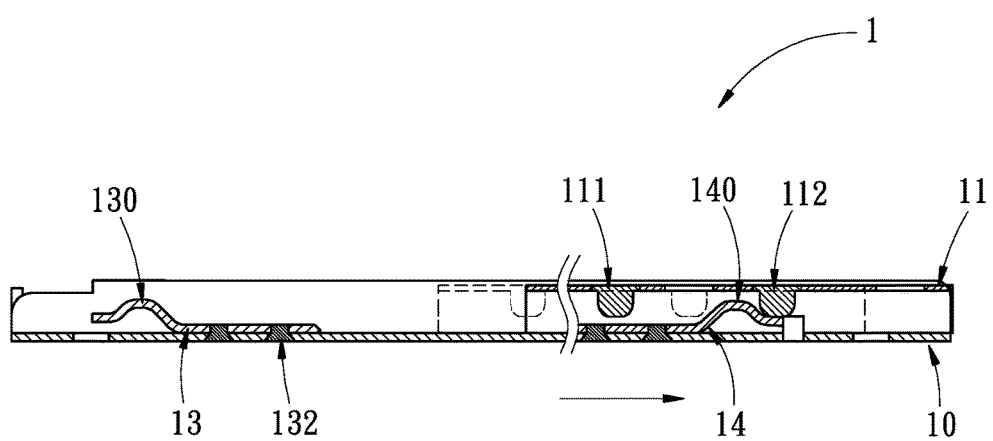
FIG. 5 is a schematic cross-sectional view of the linear sliding structure of the laptop keyboard and cover case according to the present invention.
Figure 6:
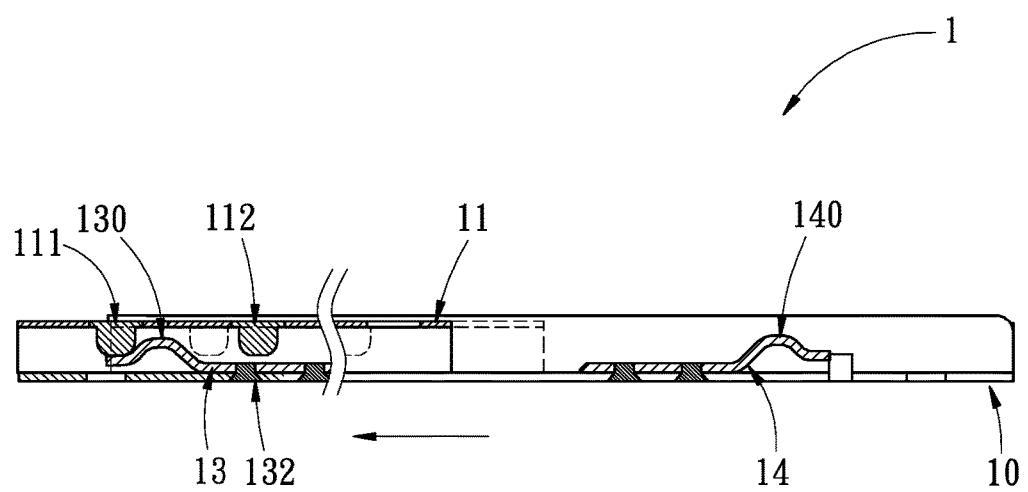
FIG. 6 is a schematic cross-sectional view of the linear sliding structure of the laptop keyboard and cover case according to the present invention.
Figures 1, 7:
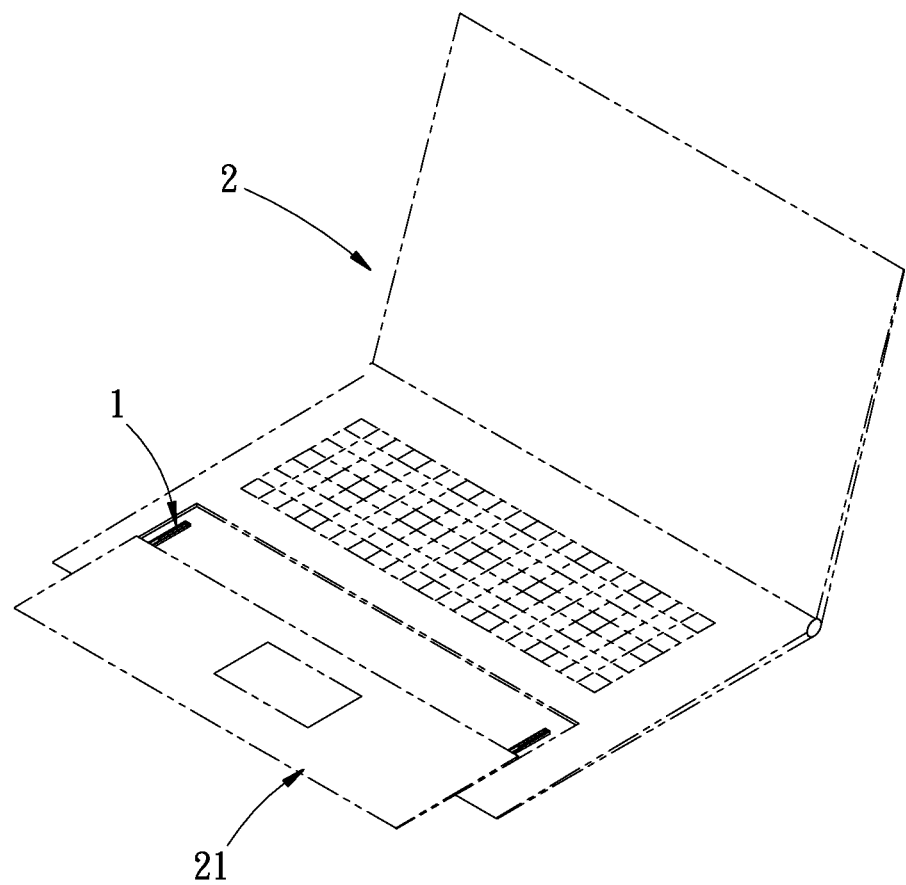
Figures 2, 7:
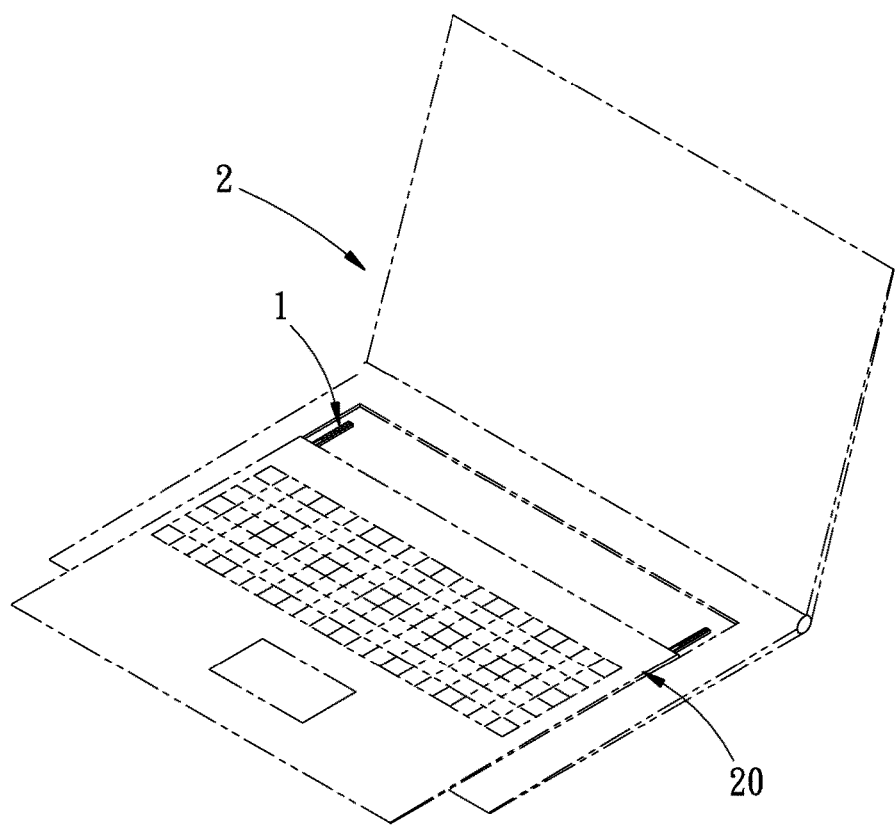

As shown in FIG. 3, FIG. 5 and FIG. 6, when the moving member 11 linearly slides on the base member 10, the first resisting member 13 and the second resisting member 14 are arranged at two ends of the base member 10, shapes of the first resisting member 13 and the second resisting member 14 form into a bent body extending to one end of a sheet body. The first stop pin 111 and the second stop pin 112 are arranged at two ends of the moving member 11. When the moving member 11 linearly slides on the base member 10, the first resisting member 13 and the second resisting member 14 of the base member 10 are used as the stopping points at the two ends.

As shown in FIG. 5, when the moving member 11 slides from one end to the final end, the second stop pin 112 of the moving member 11 corresponds to the second resisting portion 140 of the second resisting member 14 of the base member 10, and the second stop pin 112 gets over the second resisting portion 140, allowing the second resisting portion 140 to transmit a resistance force to a user and to serve as a slide stopping point. Further, as shown in FIG. 6, when the moving member 11 slides from the other end to the final end, the first stop pin 111 of the moving member 11 corresponds to the first resisting portion 130 of the first resisting member 13 of the base member 10, and the first stop pin 111 gets over the first resisting portion 130, allowing the first resisting portion 130 to transmit a resistance force to the user and to serve as the slide stopping point. A preferable sliding range limit may be provided by setting the stopping point.

As shown in FIG. 3, FIG. 7-1 and FIG. 7-2, the linear sliding structure 1 according to the present invention includes a base member 10, a moving member 11, a sliding holder 12, a first resisting member 13 (as shown in Figs), a second resisting member 14, and a ball 15, by way of which, the linear sliding structure 1 is allowed to perform a linear sliding movement.

When being implemented, the linear sliding structure 1 may be applied to a laptop 2. The laptop 2 needs to be disassembled from the bottom for maintenance, and it is complicated in procedure and poor in efficiency to disassemble those components in the laptop 2. Thus, the linear sliding structure 1 is arranged on a keyboard 20 of the laptop 2 or on a cover case 21 of the laptop 2, such that the keyboard 20 or the cover case 21 can be opened or closed by way of a linear slide. By way of the linear sliding structure 1, convenience and practicability for quick repair and component replacement may be achieved for the laptop 2.

What is claimed is:

1. A linear sliding structure of a laptop, comprising:
a base member, shaped like an inverted U, and having a first rail portion, a stopper, a first punch hole and a second punch hole, the first rail portion being formed at two sides of the base member and having an arc-shaped wall surface corresponding to a ball-bearing, the stopper being formed at one end of the first rail portion, the first punch hole formed at one end of the base member and corresponding to a first retaining hole of a first resisting member, the second punch hole formed at another end of the base member with respect to the first punch hole and corresponding to a second retaining hole of a second resisting member;
a moving member, shaped like an inverted U, and having a second rail portion, a first stop bolt and a second stop bolt, the second rail portion being formed at two sides of the moving member and having an arc-shaped wall surface corresponding to the ball-bearing, the first stop bolt being arranged at one end of the moving member and corresponding to a first resisting portion of the first resisting member, the second stop bolt being arranged at another end with respect to the first stop bolt and corresponding to a second resisting portion of the second resisting member;
a sliding holder, shaped like an inverted U, and having an accommodation portion, a first linking portion and a second linking portion, the accommodation portion being formed along longitudinal wall surfaces at two sides of the sliding holder and and disposed between the first rail portion and the second rail portion, the first linking portion being connected between the longitudinal wall surfaces at the two sides and having an arched shape, the second linking portion being connected between the longitudinal wall surfaces at the two sides and having an arched shape, and being arranged at another end of the sliding holder with respect to the first linking portion;

wherein:

the first resisting member has a bent portion defining the first resisting portion and a planar portion having the first retaining hole, the first resisting portion being a crease and corresponding to the first stop pin of the moving member to create a resisting force when the first stop pin passes the first resisting portion, the first retaining hole coupled to the first punch hole of the base member;

the second resisting member has a bent portion defining the second resisting portion and a planar portion having the second retaining hole, the second resisting portion being a crease and corresponding to the second stop pin of the moving member to create a resisting force when the second stop pin passes the second resisting portion, the second retaining hole coupled to the second punch hole of the base member;

the ball-bearing is disposed in the accommodation portion of the sliding holder;

by way of a plurality of ball-bearings arranged on the sliding holder, linear displacement of the moving member along the base member is enabled;

the first linking portion of the sliding holder is configured to abut against the first resisting member to prevent further advancement of the sliding holder in a first direction, and the second linking portion is configured to abut against the second resisting member to prevent further advancement of the sliding holder in a second direction opposite the first direction; and the linear sliding structure is implemented on a cover case of the laptop or on a keyboard of the laptop.

2. The linear sliding structure of the laptop according to claim 1, wherein the linear sliding structure is implemented on the cover case of the laptop.

3. The linear sliding structure of the laptop according to claim 1, wherein the linear sliding structure is implemented on the keyboard of the laptop.

\* \* \* \* \*